April 16, 1940.     J. A. ORR     2,197,561
GRASS CUTTER
Filed Dec. 24, 1937
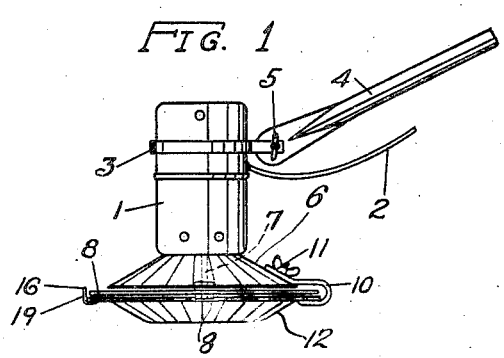
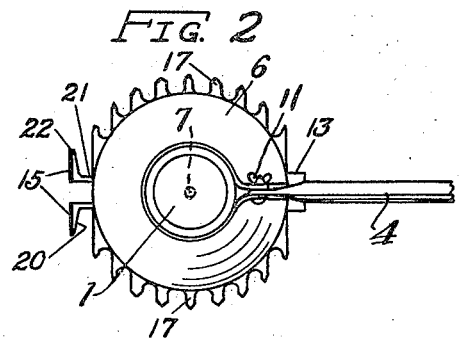
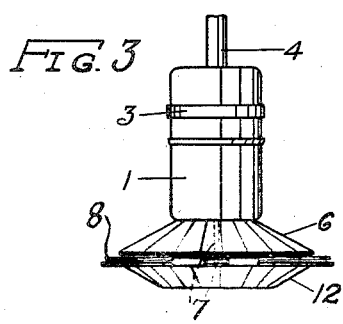
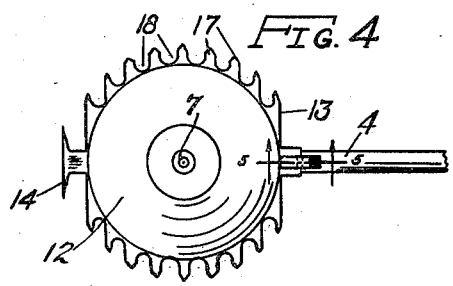
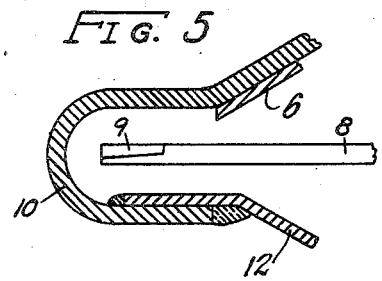
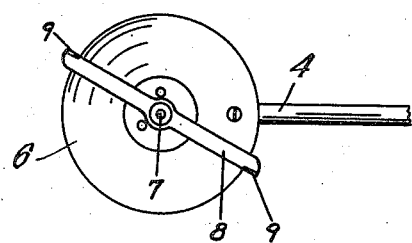
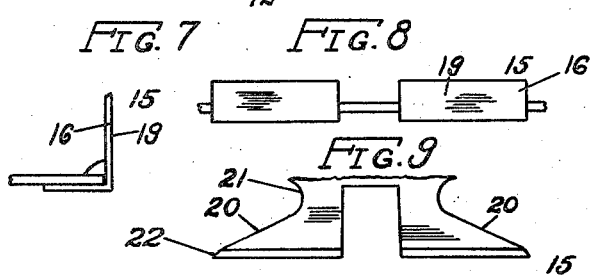
J. A. ORR
INVENTOR
PER
ATTORNEY Patented Apr. 16, 1940

2,197,561

UNITED STATES PATENT OFFICE 2,197,561

GRASS CUTTER

John Alexander Orr, Chicago, Ill.

Application December 24, 1937, Serial No. 181,619

2 Claims. (Cl. 56—25)

This invention relates to grass cutters and more specifically constitutes a modification of the type shown in my co-pending application, Ser. No. 77,661, filed May 4, 1936. The present invention provides a grass cutter that may be swung horizontally from side to side, or be swung obliquely or vertically or moved toward and away from the operator by hand in the cutting operation.

The present cutter includes guard means adapted to ride against the face of an object such as a wall, curb stone, grave head-stone or like object to protect the cutting blade from contact with the same and means for directing inwardly and into the path of the blade the grass to be cut, ample clearance being provided in this construction for the cut material to be thrown away by the blade as it rotates.

One object of the invention is to provide a grass cutter adapted for sliding movement over the ground in any direction, into or out of corners or places ordinarily difficult of access with the same facility and efficiency as when used on a clear unobstructed lawn. Means for closely following the general ground topography, whether flat, hilly, rolling or precipitous are provided.

With the foregoing and other objects in view the invention consists in the combination and arrangement of parts to be hereinafter fully described, pointed out in the claims and illustrated in the accompanying drawing, in which—

Fig. 1 is a view of the grass cutter in side elevation.

Fig. 2 is a top plan view of Fig. 1.

Fig. 3 is a view of the grass cutter in front elevation.

Fig. 4 is an inverted plan view of the grass cutter.

Fig. 5 is an enlarged fragmentary sectional view taken on the line 5—5 of Fig. 4.

Fig. 6 is an inverted plan view of the grass cutter with the toothed slide plate omitted.

Figs. 7, 8 and 9 are detail views, enlarged, of the guard and guide employed.

Like reference characters denote corresponding parts throughout.

The grass cutter is power operated, the motor 1 receiving current through the cord 2 running to an outlet. A metal strap 3 secured about the motor has one end of the stub handle 4 secured thereto by the wing nut 5, said stub handle being hollow to receive the ordinary wood or metal handle (not shown) whereby the cutter is manually moved over the ground. The motor has secured to or formed integral with its lower end the inverted dish-shaped skirt 6 through which the motor shaft 7 extends to a point beyond the plane of the free lower edge of said skirt, the rotary knife 8 fast upon said shaft being disposed immediately below said skirt edge, said knife being of a length greater than the diameter of said skirt end so that the knife ends project beyond said skirt. Cutting edges 9 are formed upon opposite sides of said knife.

An angular bracket 10 secured by a wing nut 11 to the skirt 6 extends about the free edge of the same in spaced relation thereto and is then bent inwardly or toward said skirt and secured to the dish-shaped slide plate 12 by being welded thereto and which plate is thereby supported beneath said skirt and in spaced relation thereto to provide clearance for operation of the knife 8. To the plate 12 diametrically opposite said bracket a single guard and guide 14 shown in Fig. 4, or a double guard and guide 15 as shown in Fig. 2, is secured. Each guard and guide 14 or 15 includes an upstanding lip 16 which is spaced outwardly with respect to said knife and which extends through the plane of the same to serve as a guard to prevent contact of the knife with objects likely to damage it during the cutting operation, such as stones and the like.

Formed peripherally of the slide plate 12 are the teeth 17 that extend entirely thereabout between the guards and guides 14 or 15 and the lug 13, said teeth having pointed ends and large substantially U-shaped spaces 18 formed between them, said teeth extending outwardly beyond the ends of the knife 8. In operation the cutter is moved manually over the ground, the plate 12 acting as a runner and closely following the topography of the ground surface.

In cutting grass beside a wall, curb, grave headstone or the like the cutter is moved over the ground with the guard and guide 14 or guards and guides 15 in sliding engagement with the face of the same to space the blade therefrom and prevent damage through contact therewith. When cutting grass in the clear the cutter may be moved to the right or left as well as forwardly or rearwardly due to the presence of guard teeth 17 substantially all about the slide plate periphery except for the guards and guides and lug. As the slide plate is secured to the skirt of the motor at but one point there is but this single point at which cut grass, grass sap and the like may accumulate upon the cutter. This assures the free operation of the cutter blade and it is made self-cleaning, the cut material being thrown away by the blade.

Referring again to guards and guides 14 or 15 the upstanding lip portion has a flat outermost face 19 that rides directly against the face of a wall or curb when cutting grass growing thereagainst and a bevelled web portion 20 that extends from the stem 21 to the free tip end 22 of the lip portion. The tip end of the lip riding against the wall will scoop in the standing grass and cause the same to ride along the bevelled web 20 into the path of the rotary blade.

What is claimed is:—

1. In a grass cutter, a dish-shaped slide plate, teeth formed peripherally thereof, a rotary knife arranged immediately above said slide plate, and a guard and guide secured to said slide plate and extending beyond the periphery thereof, said guard and guide including an upstanding flat faced lip portion and beveled web portions extending inwardly therefrom immediately below said knife, said lip extending through the plane of said knife.

2. In a grass cutter, a slide plate, groups of teeth formed peripherally and upon opposite sides thereof, a rotary knife arranged directly above said slide plate, and a guard and guide secured to said slide plate and extending outwardly beyond the periphery thereof and beyond the ends of said knife, said guard and guide being disposed between the said groups of teeth, said guard and guide including an upstanding flat faced lip portion cutting the plane of said knife and beveled web portions extending inwardly from the base of said lip immediately below said knife.

JOHN ALEXANDER ORR.